United States Patent [19]
Izumi et al.

[11] Patent Number: 5,657,056
[45] Date of Patent: Aug. 12, 1997

[54] DISPLAY DEVICE

[75] Inventors: Yoshihiro Izumi, Kashihara; Sayuri Fujiwara, Nara, both of Japan

[73] Assignee: Sharp Kabushiki Kaisha, Osaka, Japan

[21] Appl. No.: 465,394

[22] Filed: Jun. 5, 1995

Related U.S. Application Data

[63] Continuation of Ser. No. 126,246, Sep. 23, 1993, abandoned.

[30] Foreign Application Priority Data

Nov. 25, 1992 [JP] Japan ................... 4-315416

[51] Int. Cl.$^6$ ........................................ G09G 5/00
[52] U.S. Cl. .................. 345/205; 345/87; 345/176
[58] Field of Search ............................ 345/60, 64, 87, 345/89, 175, 176, 205; 359/42, 54, 55, 58, 60

[56] References Cited

U.S. PATENT DOCUMENTS

| | | | |
|---|---|---|---|
| 4,892,389 | 1/1990 | Kuijk | 345/89 |
| 5,003,167 | 3/1991 | Arques | 345/175 |
| 5,307,186 | 4/1994 | Izumi et al. | 359/42 |

FOREIGN PATENT DOCUMENTS

| | | |
|---|---|---|
| 0 185 995 A3 | 7/1986 | European Pat. Off. . |
| 0 463 803 A3 | 1/1992 | European Pat. Off. . |
| 0 490 484 A2 | 6/1992 | European Pat. Off. . |
| 1-156724 | 6/1989 | Japan . |
| 1-173016 | 7/1989 | Japan . |
| 2-89029 | 3/1990 | Japan . |

OTHER PUBLICATIONS

Patent Abstracts of Japan; vol. 10, No. 387; (P–530); and JP–S–61 175 623 (SEIKO).
Proceedings Of The Sid; vol. 26, No. 1; 1985; Los Angeles U.S.; pp. 9–15; S. Togashi "An LC–TV Display Controlled By A a–Si Diode Rings"; Chapters 2 and 4.
Patent Abstracts Of Japan; vol. 017; No. 194 (p–1522) and JP–A–04 340 932 (Seiko Epson) 27; Nov. 1992.
European Search Report.

*Primary Examiner*—Richard Hjerpe
*Assistant Examiner*—Kent Chang
*Attorney, Agent, or Firm*—David G. Conlin; Milton Oliver

[57] ABSTRACT

A liquid crystal display device provides two substrates, a display medium, a plurality of light waveguides, a plurality of signal wires, and a plurality of light switching elements, being provided at crosspoints between said plurality of light waveguides and said plurality of signal wires. On the clad layer of the light waveguide, the p-type and the i-type of the a-Si:H are laminated. On one end of the top of the i-type, the n-type is overlapped with part of the signal wire. On the other end of the top of the i-type, the n-type is overlapped with the drain electrode. On the drain electrode, a pixel electrode is formed. That is, the light switching element has an element structure in which nipin type back-to-back diodes composed of two pin type diodes series-connected in reverse are ranged in parallel toward light transmission. Hence, the same light signal is transmitted to these two back-to-back diodes. This structure of light switching element makes it possible to offer a completely symmetric switching characteristic against voltage and realize a more simply-designed switching element and high display performance and reliability.

6 Claims, 13 Drawing Sheets

Fig. 10A
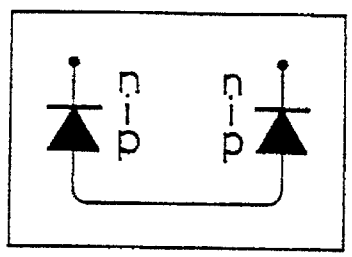
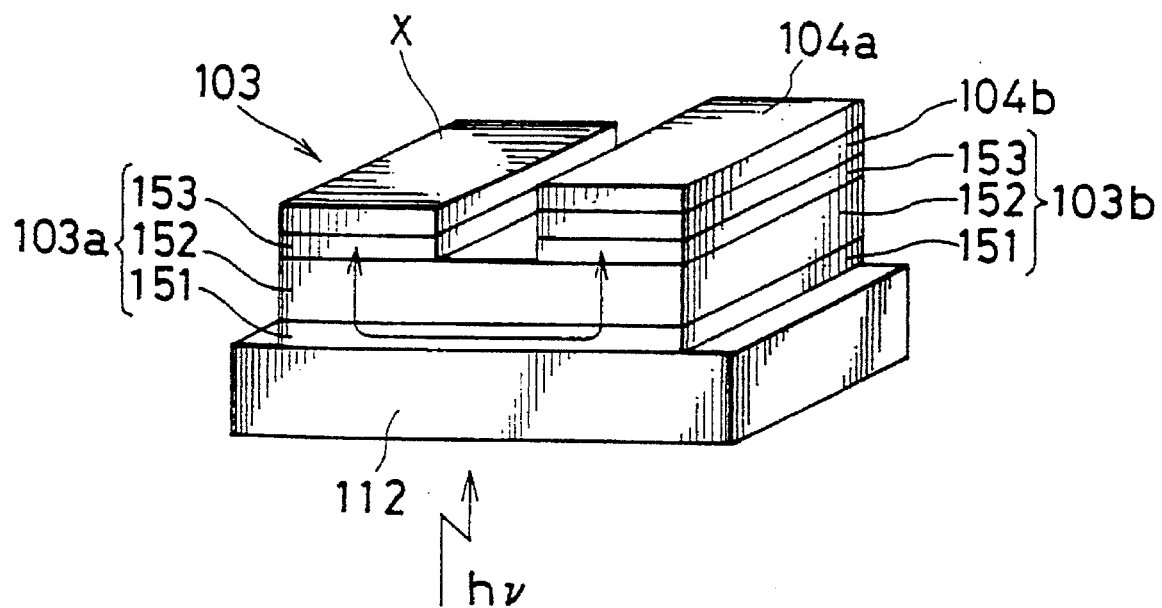
Fig. 10

DISPLAY DEVICE

This is a Continuation of application Ser. No. 08/126,246 filed Sep. 23, 1993, now abandoned.

BACKGROUND OF THE INVENTION

1. Field of the Invention

The present invention relates to a light addressing display device which may be expected to apply to AV equipment or OA equipment like a computer requesting a TV image display and an optical image information processing apparatus.

2. Description of the Related Art

When transmitting a driving signal on an electric wire, the implementation of a large display device or a high-definition display device is made impossible, because the signal waveform is delayed by resistance or capacitance on wires. To solve this disadvantage, a light scan type display device may be used for transmitting a light signal as a scan signal. That is, in the case of using a ray of light as a scan signal, unlike the case of using an electric signal, no delay of the signal waveform takes place without being influenced by the resistance or capacitance on wires.

To solve these problems, there has been developed a light addressing type display device which is arranged to transmit a driving signal with light (Japanese Patent Lying-open Nos. Hei 2-89029 and 1-173016, Japanese Patent Application No. Hei 3-263947 and the like).

FIGS. 17 and 18 show a light scan type active-matrix system liquid crystal display device which the applicants of the present invention proposed in the Japanese Patent Application No. Hei 3-263947.

This liquid crystal display device is arranged to have a pair of a base substrate 121 and an opposed substrate 122 and a liquid crystal 108 laid between the pair of substrates 121 and 122. The base substrate 121 has a plurality of light waveguides Y1, Y2, ..., Yn on the glass substrate 105a, those light waveguides being ranged horizontally. On those light waveguides, a plurality of signal wires X1, X2, ..., Xm are ranged vertically in a manner to be crossed with the light waveguides. In each section defined by crossing the light waveguide Y (Y is used for describing one light waveguide. Likewise, X is used for describing one signal wire) and the signal wire X, the pixel electrodes 104, 104, ... are formed on the glass substrate 105a in a manner to bury the sections. Part of each pixel electrode is formed in a manner to expand over one of the light waveguides Y for defining this section.

At a crosspoint between this light waveguide Y and the signal wire X, there is provided a light switching element 103 made of a photoconductive layer on the light waveguide Y. This light switching element 103 is overlapped with part of the pixel electrode 104 extending over the light waveguide Y. Hence, the light switching element 103 is vertically laid between the overlapped portion of the pixel electrode 104 and the signal wire X. And, an orientation film 109a is formed over all the pixel area of the substrate in a manner to cover them.

The photoconductive layer for forming the light switching element 103 is formed by means of a plasma CVD (Chemical Vapor Deposition) technique. The photoconductive layer uses hydrogenated amorphous silicon (a-Si:H) which may be formed on a large area at low temperature. Since the photoconductive layer needs to raise its impedance in a dark state where no light is applied, intrinsic hydrogenated amorphous silicon (i-a-Si:H) is used.

On the outside of the glass substrate 105a, a light cut-off layer 110a is provided at a location corresponding to each light switching element 103. This light cut-off layer 110a operates to prevent outside light from the outer surface of the glass substrate 105a from being incident on the light switching element 103.

On the inside of the glass substrate 105b composing an opposed substrate 122, a transparent electrode 106 is formed over all the pixel area. On the transparent electrode 106, a light cut-off layer 110b is formed at a location for each light switching element 103 on the base substrate 105a. This light cut-off layer 110b serves to prevent the outside light from the outer surface of the glass substrate 105b from being incident on the light switching element 103. An orientation film 109b is formed to cover the transparent electrode 106.

Such a light scan type liquid crystal display device operates as follows. When the luminous element array 101 and the micro lens array 102 apply a ray of light to the switching element 103 through the light waveguide Y, the light switching element 103 lowers its impedance, when a signal voltage is applied so that the signal wire X may be electrically connected with the pixel electrode 104. When no light is applied, the light switching element 103 raises its impedance, so that the signal wire X may be electrically insulated from the pixel electrode 104. That is, the optical scan type liquid crystal display device uses a ray of light as a scan signal. According to the change of impedance of the light switching element 103, the scan signal is switched on and off for selectively driving the pixel electrode 104.

By the way, the impedance of the photoconductive layer in the dark state where no light is applied is greatly dominated by injecting carriers (secondary current) from the electrode. Hence, in the electrode arrangement having an Ohmic junction, the impedance of the photoconductive layer in the dark state is not allowed to rise to a sufficiently large value. This also results in being unable to disadvantageously obtain such a sufficient on/off ratio of the impedance as meeting a request for sequentially driving the liquid crystal line by line.

On the other hand, heretofore, the use of a diode structure for the light switching element 103 makes it possible to develop a liquid crystal display device which offers an improved switching characteristic. The diode used therefore may include a pin diode, a Schottky diode, a MIS diode and the like. In general, the diode indicates a current to voltage characteristic as shown in FIG. 19 in the dark state where no light is applied. As shown by a broken line of FIG. 19, the current value I keeps a value close to "0" at high impedance in the reversely biased state. This is because the energy barrier serves to inhibit injection of carriers. When light is applied, the similar injection of carriers is inhibited, while as shown by a real line of FIG. 19, the influence of carriers generated by the light becomes more dominant as the light intensity increases (a thin line of FIG. 19 shows when the light application is small and a thick line of FIG. 19 shows when the light application is large). Hence, even in the reversely biased state, the low impedance can be kept. As such, by arranging the light switching element 103 to have a diode structure and using the reversely biased characteristic, it is possible to increase the change of impedance (on/off ratio) against a bright/dark state. These diode characteristics are described in detail in "Basics of Semiconductor Device (Ohm edition, Ltd.)", for example.

To keep the reversely biased state, however, it is necessary to constantly keep feeding of a single-biased data signal to the light switching element 103. In this case, the single-biased (d.c. components) signal is being applied to the liquid crystal served as a display medium when driving the device. When the single-biased signal is applied to the liquid crystal, decomposition of liquid crystal molecules or fitting of impurity on the electrode is more likely to take place. This is disadvantageous in light of reliability. Therefore, the display device having liquid crystal as a display medium should be driven by an a.c. waveform signal containing no d.c. components. It means that the display device requires the light switching element 103 indicating a symmetric characteristic against voltage.

SUMMARY OF THE INVENTION

It is therefore an object of the invention to provide a display device which is capable of improving the display quality for enhancing the switching operating performance.

In the first aspect of the invention, there is provided a display device having a display medium provided between two substrates each having an electrode, one substrate provides a plurality of linear light waveguides ranged in parallel to one another, a plurality of linear electrodes ranged in parallel to one another and in the direction crossed with the plurality of linear light waveguides, and a plurality of photoconductive layers having a back-to-back diode structure and provided at the crosspoints between the plurality of linear light waveguides and the plurality of linear electrodes and operated to switch in response to light applied from the linear light waveguide. Each pixel of the display medium is driven in response to the signal applied through the linear electrode and the photoconductive layer.

The photoconductive layer operates to lower its impedance, thereby becoming conductive if the light conducted through the plurality of linear light waveguides is applied to the photoconductive layer. As a result, the signal is transmitted to the pixel of the display medium layer from the corresponding linear electrode through the photoconductive layer. If no light is applied, the photoconductive layer keeps non-conductive. Hence, no signal from the linear electrode can be transmitted to the pixels of the display medium. That is, the photoconductive layer performs a switching operation like an active element.

This photoconductive layer has a back-to-back diode structure. Hence, in the state (bright state) where light is applied and the state (dark state) where no light is applied, injection of carriers from the electrodes to the photoconductive layers is inhibited by an energy barrier occurring on each interface between the photoconductive layer and the electrode or on interface in the photoconductive layer. In the dark state, the photoconductive layer operates to constantly enhance its impedance. Further, in the bright state, the photoconductive layer operates to sufficiently lower its impedance because the layer is more greatly dominated by the carriers generated by application of light rather than the injection of carriers from the electrode. This operation sufficiently meets an impedance on/off ratio requested for driving the pixels of the display medium line by line. Furthermore, the same amount of carriers to be injected are inhibited by both of the electrodes between which the photoconductive layer is laid. This results in achieving the symmetric current to voltage characteristic of the photoconductive layer (rectification). This symmetric current to voltage characteristic makes it possible to offer a symmetric switching performance (change of impedance) according to the polarity of the electric signal fed from the linear electrode. The pixels of the display medium quid crystal layer are allowed to be driven in response to a symmetric a.c. waveform.

Hence, the display device of the present invention may has an improved switching operating performance and an improved display quality.

In the second aspect of the invention, there is provided a display device being arranged to seal a display medium between two substrates, one of which provides a plurality of light waveguides ranged in parallel to each other, a plurality of signal wires ranged in parallel to each other in a direction crossed with the plurality of light waveguides, and a plurality of light switching elements operating in a response to a signal ray of light transmitted from the light waveguides and being provided at crosspoints between the plurality of light waveguides and the plurality of signal wires, and to drive display pixels of the display medium in response to a signal applied thereto through the signal wires and the light switching elements, is characterized in that the light switching element being composed of two diodes for making a back-to-back structure located in parallel toward the application of light. This display device can achieve the foregoing object.

Preferably, the light switching element is formed by partially etching the pin junction type or nip junction type laminating film of a semiconductor.

Further, preferably, the light switching element is formed by partially etching a hetero junction type pin or nip laminating film of a semiconductor.

Moreover, preferably, the hetero junction type pin or nip laminating film is formed by a semiconductor material having a larger optical band gap than at least one of an n layer and a p layer than an i layer.

Preferably, as the two diodes, Schottky barrier diodes are used.

The light switching element is formed of two diodes connected to have a back-to-back structure and arranged in parallel toward the application of light. In this arrangement, the same intensity of light is applied to both of the diodes. This results in indicating a completely symmetric switching characteristic.

Further objects and advantages of the present invention will be apparent from the following description of the preferred embodiments of the invention as illustrated in the accompanying drawings.

BRIEF DESCRIPTION OF THE DRAWINGS

FIG. 10 is a perspective view showing an embodiment 4 of a light switching element according to the present invention.

DESCRIPTION OF THE PREFERRED EMBODIMENTS

Figure 1:
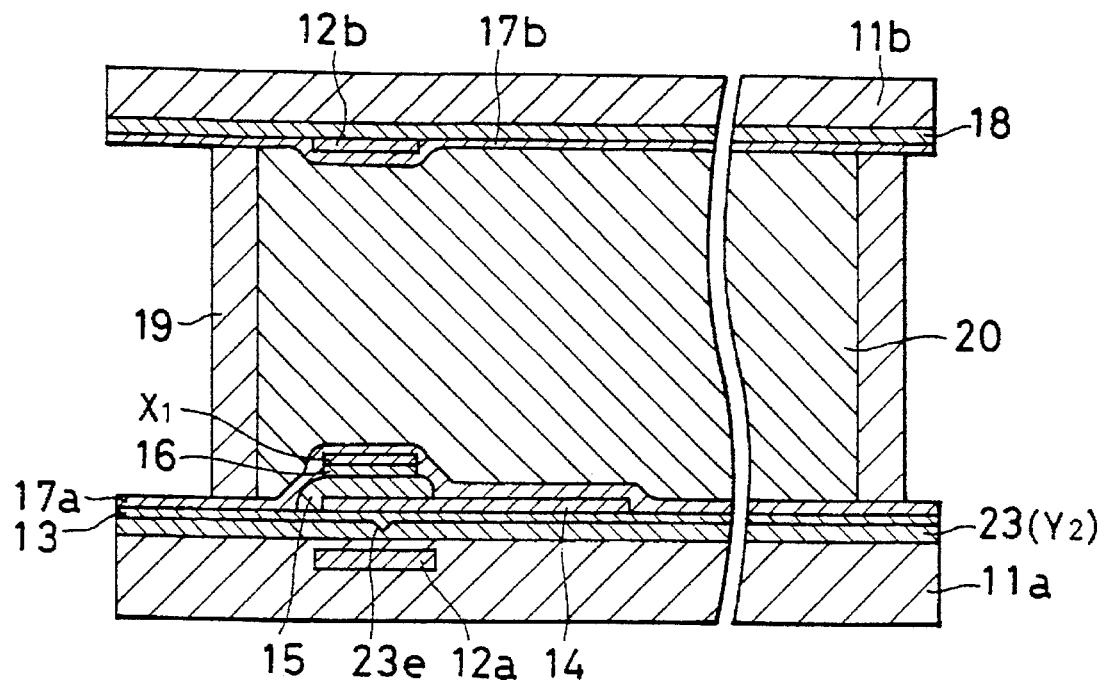
FIG. 1 is a sectional view showing an arrangement of an active-matrix driving type liquid crystal display device according to a first embodiment of the present invention.

Hereafter, the description will be oriented to an embodiment of the present invention as referring to the drawings.

Figure 2:
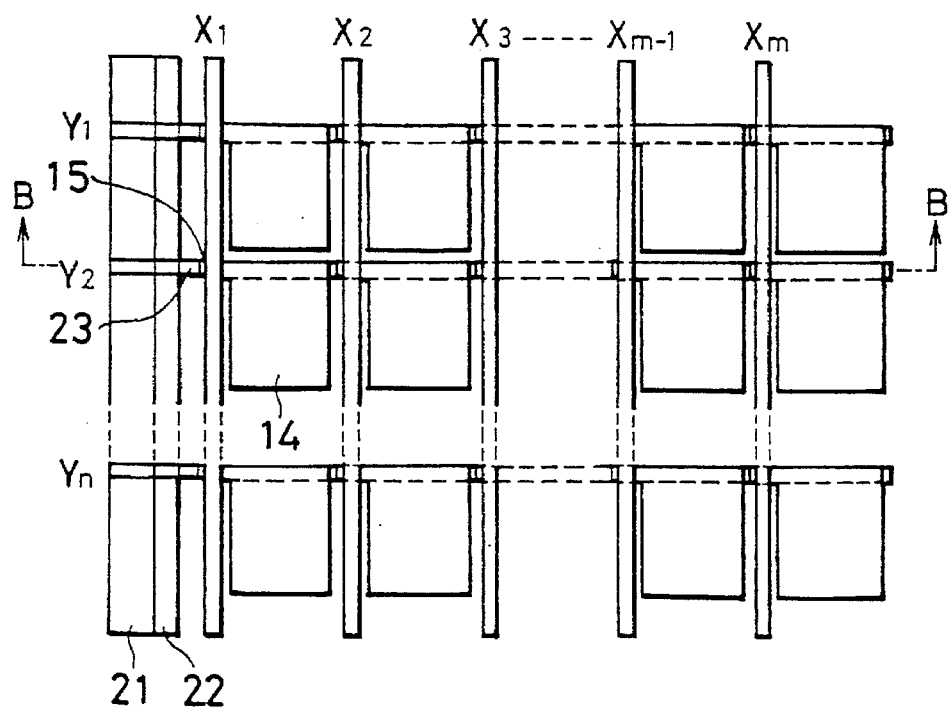
FIG. 2 is a plan view showing an arrangement of an active-matrix driving type liquid crystal display device according to the first embodiment of the present invention.

FIG. 1 is a sectional view showing an arrangement of an active-matrix driving type liquid crystal display device according to a first embodiment of the present invention. FIG. 2 is a plan view showing an arrangement of the active-matrix driving type liquid crystal display device according to the first embodiment. The section of FIG. 1 is cut on the B—B line.

In the plan view of FIG. 2, a glass substrate 11b, a light cut-off layer 12b, orientation layers 17a and 17b, a transparent electrode 18, a sealing member 19 and a liquid crystal layer 20 are not illustrated though they are not shown in the section of FIG. 1. In the section of FIG. 1, a luminous portion composed of a luminous element array 21 and a micro lens array 22 is not illustrated though they are shown in the plan view of FIG. 2.

As shown in both of the figures, on one glass substrate 11a, a plurality of linear light waveguides Y1, Y2, ..., Yn are ranged in the Y direction (horizontally as viewed in FIG. 2). On these light waveguides, a plurality of linear electrodes X1, X2, ..., Xm-1, and Xm are ranged in the X direction (vertically as viewed in FIG. 2) in a manner to be crossed with those light waveguides.

The linear light waveguides Y1, Y2, ..., Yn are formed by thermally diffusing thallium ion (Tl+) on the glass substrate 11a. In addition to the waveguides formed in such a manner, the linear light waveguides Y1, Y2, ..., Yn may be any one of a silicon dioxide (SiO2) system light waveguide formed by means of a flame hydrolysis deposition (FHD) technique or a chemical vapor deposition (CVD) technique, a light waveguide composed of a high molecular material, an optical fiber and the like only if it may meet the light-conducting performance and the processing conditions.

The linear electrodes X1, X2, ..., Xm may use Al formed by a sputtering technique in this embodiment.

Each of the linear light waveguides Y1, Y2, ..., Yn, for instance, the linear light waveguide Y2 is composed of a luminous portion consisting of a luminous element array 21 and a micro lens array 22 and a linear light waveguide 23 for transmitting a ray of light from this luminous portion. The luminous element array 21 is coupled with the light waveguide 23 through the effect of the micro lens array 22.

Inside of the glass substrate 11a, the light cut-off layer 12a is formed for preventing light (outside light) leaked from the lower side of the element from being incident on the photoconductive layer formed on the light waveguides. The light cut-off layer 12a is formed on the same pattern as the photoconductive layer for forming the light switching element 15 to be described later.

On the linear light waveguide Y2 (light waveguide 23), an SiO2 thin film is formed as a clad layer 13 by means of a sputtering technique.

On the surface of the light waveguide 23, there is formed a light scattering portion 23e below the light switching element 15. The light scattering portion 23e serves to adjust light to be applied to the light switching element 15. The provision of the light scattering portion 23e makes it possible to increase the quantity of light emitted from the light waveguide 23 to the outside, thereby enhancing a light utilization ratio.

On the clad layer 13, a transparent pixel electrode 14 is formed by depositing ITO with the sputtering technique and patterning the ITO layer.

At each of the crosspoints between the linear light waveguides Y1, Y2, ..., Yn and the linear electrodes X1, X2, ..., Xm, a light switching element formed of the photoconductive layer is provided. The light switching element is provided between each of the linear electrodes X1, X2, ..., Xm and a pixel electrode 14 for driving a display medium such as liquid crystal.

For instance, at a crosspoint between the linear light waveguide Y2 and the linear electrode X1, the light switching element 15 is provided between the linear electrode X1 and the pixel electrode 14.

The photoconductive layer for forming the light switching element 15 is an a-Si:H film formed on the pixel electrode 14. by means of a plasma CVD technique.

In addition, the thickness of the a-Si:H layer for forming the photoconductive layer is preferably 0.5 μm to 1.2 μm. In this embodiment, the thickness is set as 0.6 μm.

On the light switching element 15, the transparent electrode 16 and the linear electrode X1 are formed by depositing ITO and Al as layers with the sputtering technique and patterning them with a photolithography technique, respectively.

On these layers, a polyimide film is formed by a spinner and then is subject to the rubbing process for forming the orientation layer 17a.

The light switching element formed by the above-mentioned process at each of the crosspoints between the linear light waveguides Y1, Y2, ..., Yn and the linear electrodes X1, X2, ..., Xm is controlled by a light signal transmitted from the luminous element array 21 through the linear light waveguides Y1, Y2, ..., Yn.

In the light switching element 15 formed at the crosspoint between the linear light waveguide Y2 and the linear electrode X1, two electrodes contacting with the photoconductive layer formed by the a-Si:H material, that is; the pixel electrode 14 and the transparent electrode 18 on the side of the linear electrode X1 are formed by one electrode material of ITO. As such, the interface between the photoconductive layer and the pixel electrode 14 keeps the same magnitude of energy barrier (Schottky barrier) as the interface between the photoconductive layer and the transparent electrode 16.

The light switching element 15, therefore, indicates the same characteristic as a back-to-back diode.

In addition, the transparent electrode 16 uses ITO as its material. In actual, the use of a material of SnO2 or a laminated film of ITO and SnO2 for the transparent electrode 16 makes it possible to offer the same effect. In this embodiment, the linear electrodes X1, X2, . . . , Xm use Al as their materials. The linear electrodes may uses another conductive material such as chromium (Cr), nickel (Ni), titanium (Ti), molybdenum (Mo) or ITO. In addition to the material of a-Si:H, the photoconductive layer of the light switching element 15 may use hydrogenated amorphous silicon germanium (a-SiGe:H) against a ray of a near infrared wavelength.

In this embodiment, a laser diode (LD) array is used as a luminous element array. It may use a light-emitting diode (LED) array.

On the other glass substrate 11b, a transparent electrode 18 is formed by depositing ITO by means of the sputtering technique.

On the transparent electrode 18, a light cut-off layer 12b is formed in a manner to match to the patterns of the light switching element 15 and the light cut-off layer 12a formed on the opposite glass substrate 11a. This light cut-off layer 12b serves to prevent light (outside light) leaked from the upper side of the element from being incident on the light switching element 15.

On these transparent electrode 18 and the light cut-off layer 12b, a polyimide film is formed with a spinner and is subject to the rubbing process for forming the orientation layer 17b.

For forming the orientation layers 17a and 17b, an obliquely deposited film of SiO or SiO2 may be used.

By dispersing spacers (not shown) between the substrates each having the layers, pasting both of the substrates through a sealing member 19, and injecting liquid crystal between the substrates, it is possible to form the liquid crystal layer 20.

The liquid crystal layer 20 uses as a display mode a twisted nematic mode. The used liquid crystal is fluorine liquid crystal manufactured by the MERCK Company, ZLI-4792. By injecting this liquid crystal in vacuum, it is possible to form the liquid crystal layer 20.

The liquid crystal layer 20 may use as a liquid crystal display mode a guest host mode, an ECB mode, a super-twisted nematic (STN) mode, and a phase transition mode if nematic liquid crystal is used. In addition, an SSFLC mode may be used if chiral smectic liquid crystal is used and a PDLC mode may be used if a compound film of a high molecular material and liquid crystal is used.

The glass substrates 11a and 11b are one embodiment of two substrates included in the present invention. The light switching element 15 is one embodiment of a photoconductive layer included in the present invention. The liquid crystal layer 20 is one embodiment of a liquid crystal layer included in the present invention. The light waveguide 23 and the linear light waveguides Y1, Y2, . . . , Yn are one embodiment of a plurality of linear light waveguides included in the present invention. The linear electrodes X1, X2, . . . , Xm are one embodiment of a plurality of linear electrodes included in the present invention.

Next, the description will be oriented to the method for driving the liquid crystal display device according to this embodiment.

A ray of light is propagated from the luminous portion to the linear light waveguides Y1 to Yn for doing optical scanning in a manner that the electric signals are applied to the linear electrodes X1, X2, . . . , Xm according to the ray of light being propagated. While the linear light waveguides Y1, Y2, . . . , Yn are made operative, the light switching elements on the operated linear light waveguides are turned on, so that the electric signals sent from the linear electrodes X1, X2, . . . , Xm may be applied to the corresponding pixel electrodes for forming a display image.

According to this embodiment, the light switching element has a back-to-back diode structure. Hence, in the bright state where light is applied or the dark state where no light is applied, the injection of carriers from the pixel electrode and the transparent electrode into the photoconductive layer for forming the light switching element is inhibited by an energy barrier occurring on the interface between the photoconductive layer and the pixel electrode or the transparent electrode.

As such, the photoconductive layer keeps a quite high impedance in the dark state. In the bright state, the photoconductive layer keeps a quite low impedance, because the carriers generated by the light dominates the photoconductive layer far more than the carriers injected from the electrodes. This results in making it possible to meet an on/off ratio of impedance requested for sequentially driving the liquid crystal line by line.

Figure 3:
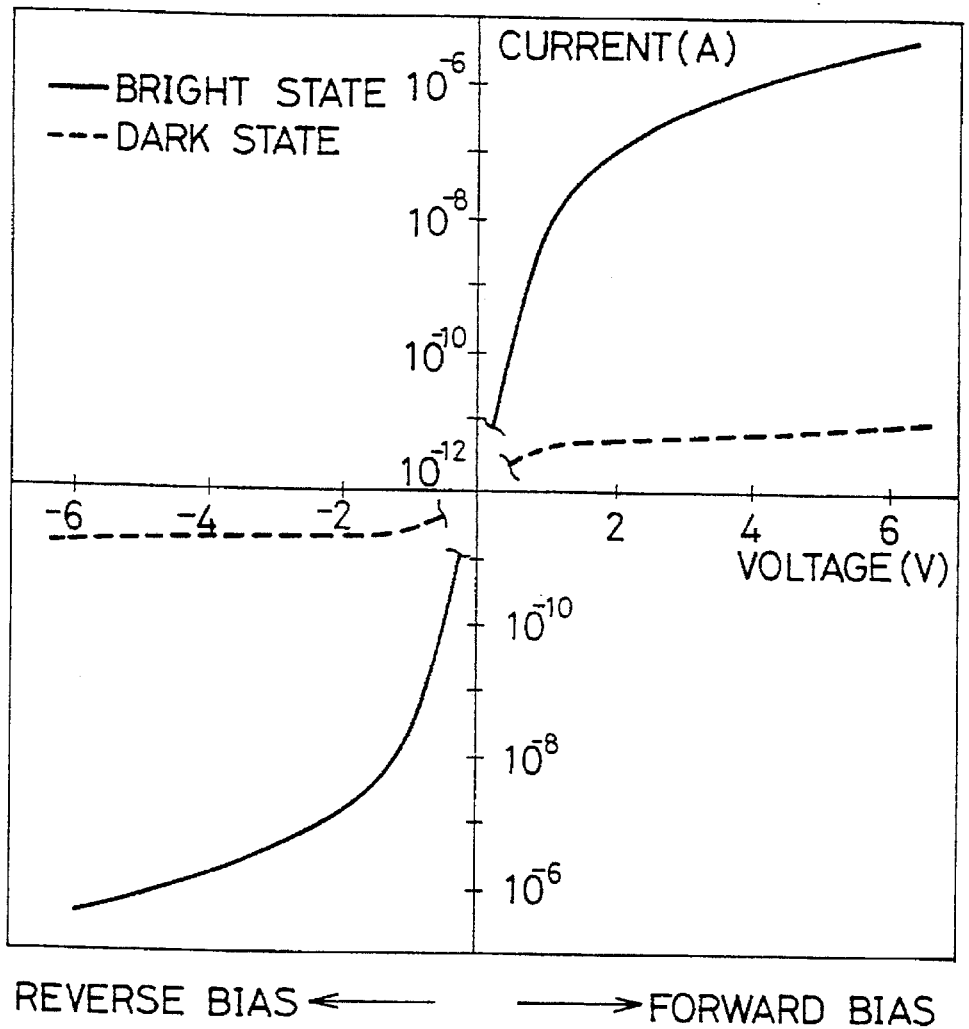
FIG. 3 is a graph showing a current to voltage characteristic of the photoconductive layer.

FIG. 3 is a graph showing a current to voltage characteristic of a photoconductive layer.

As shown in FIG. 3, the same amount of carriers to be injected are inhibited by both of the electrodes between which the photoconductive layer is laid. This results in achieving the symmetric current to voltage characteristic of the photoconductive layer (rectification). This symmetric current to voltage characteristic makes it possible to offer a symmetric switching performance (change of impedance) according to the polarity of the electric signal fed from the linear electrode. The signal of a symmetric a.c. waveform is applied to the liquid crystal.

Hence, this symmetric current to voltage characteristic makes it possible to improve the switching performance, thereby enhancing the display quality and the reliability of the liquid crystal display device.

As a method for producing a light switching element having a back-to-back structure, a method for using a doping layer formed by doping impurity in the photoconductive layer in addition to the method for using the Schottky junction as indicated in the first embodiment.

Next, the liquid crystal display device produced by using the light switching element with the doping layer will be described as a second embodiment of the invention.

Figure 4:
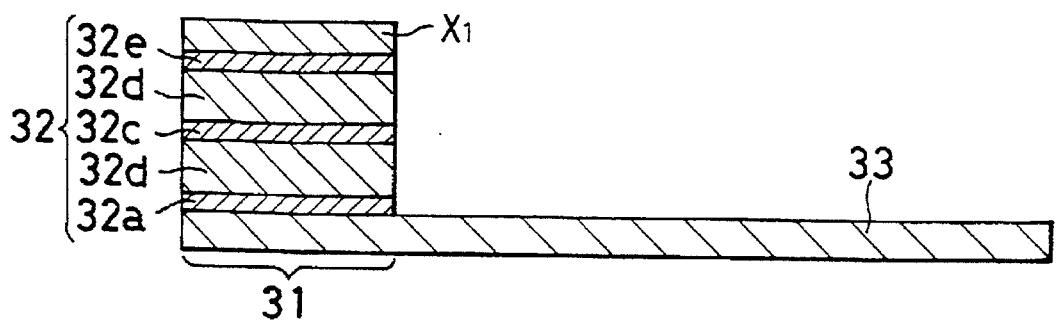
FIG. 4 is a sectional view showing a schematic arrangement of a light switching element portion arranged to use a doping layer of a-Si:H.

FIG. 4 is a schematic sectional view showing a light switching element using a doping layer of a-Si:H.

As shown in FIG. 4, a pixel electrode 33 and a linear electrode X1 correspond to the pixel electrode 14 and the linear electrode X1 included in the first embodiment shown in FIG. 1 respectively.

The pixel electrode 33 is composed of ITO. On the portion 31 corresponding to the light switching element on the pixel electrode 33, a photoconductive layer 32 formed of a laminating film of a-Si:H and a linear electrode X1 made of Al are formed in sequence.

The ITO and Al layers used herein are produced by the sputtering technique and are patterned with the photolithography technique.

The laminating film of a-Si:H forming the photoconductive layer 32 includes an n-type a-Si:H film 32a, an i-type a-Si:H film 32b, a p-type a-Si:H film 32c, an i-type a-Si:H film 32d and an n-type a-Si:H film 32e laminated in sequence.

The photoconductive layer 32 is one embodiment of the photoconductive layer included in the present invention.

As a method for producing the photoconductive layer 32, the n-type a-Si:H film 32a is formed on the pixel electrode 33 by means of the plasma CVD method with a silane (SiH4) gas, a hydrogen (H2) gas and a phosphine (PH3) gas as a raw material. The thickness of the n-type a-Si:H film 32a should range from 100 Å to 500 Å. The preferable thickness is about 200 Å.

Next, on the n-type a-Si:H film 32a, the i-type a-Si:H film 32b is formed with the SiH4 gas and the H2 gas. The thickness of the i-type a-Si:H film 32b should range from 0.4 µm to 2.5 µm. The preferable thickness is about 0.8 µm.

Next, on the i-type a-Si:H film 32b, the p-type a-Si:H film 32c is formed with the SiH4 gas, the H2 gas, and a diborane (B2H6) gas. The thickness of the p-type a-Si:H film 32c should range from 100 Å to 500 Å. The preferable thickness is about 250 Å.

Further, on the p-type a-Si:H film 32c, the i-type a-Si:H film 32d is formed by the same method as the foregoing i-type a-Si:H film 32b. The thickness of the i-type a-Si:H film 32d should range from 0.4 µm to 30 µm. The preferable thickness is about 0.9 µm.

Lastly, on the i-type a-Si:H film, the n-type a-Si:H film is formed by the same method as the foregoing n-type a-Si:H film 32a. The thickness of the n-type a-Si:H film 32e should range from 100 Å to 600 Å. The preferable thickness is about 250 Å.

Figure 5:
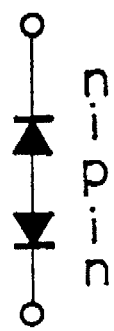
FIG. 5 is a circuit diagram showing the light switching element portion shown in FIG. 4.

FIG. 5 is a circuit diagram showing the light switching element portion shown in FIG. 4.

The light switching element composed of the photoconductive layer 32 of an nipin type a-Si:H film produced as described above, as shown in FIG. 5, indicates the performance appearing when two pin diodes are connected in opposite to each other, that is, the characteristic of the back-to-back diode.

As such, when light is applied, the photoconductive layer 32 sufficiently lowers its impedance so that the linear electrode X1 may be electrically connected with the pixel electrode 33. When no light is applied, the photoconductive layer 32 raises its impedance according to the characteristic of the back-to back diode, whichever polarity the signal waveform applied onto the photoconductive layer 32 may have. Hence, the linear electrode X1 is insulated from the pixel electrode 33. That is, the light switching element composed of the photoconductive layer 32 of such an nipin type a-Si:H film indicates a symmetric switching characteristic against the polarity of the signal waveform to be applied.

By using the aforementioned light switching element of an nipin type a-Si:H film in place of the light switching element 15 provided in the liquid crystal display device of the first embodiment shown in FIGS. 1 and 2, the liquid crystal display device according to the second embodiment is allowed to be formed.

The arrangement of the liquid crystal display according to the second embodiment is common to the arrangement of the first embodiment except the light switching element.

Hence, this embodiment makes it possible to apply a complete a.c. waveform to the liquid crystal.

In this embodiment, as a material of the light switching element providing the doping layer, the nipin type laminating film made of the material of a-Si:H is used, because the material allows the film to expand over a large area at low temperature. In place of the nipin type laminating film, the pinip type laminating film may be used. Further, the use of an npn type or pnp type laminating film made of polysilicon (p-Si) makes it possible to realize a light switching element with high performance. In addition, against the ray of a near infrared wavelength, the material of a-SiGe:H may be used.

In the light switching element included in this embodiment shown in FIG. 4, in place of the n-type and i-type a-Si:H 32a and 32b on the light-applied side, that is, on the side of the pixel electrode 33, the material of n-type and i-type hydrogenated amorphous silicon carbite (a-SiC:H) may be used for further improving the performance. The arrangement of the light switching element when using this material will described later.

Figure 6:
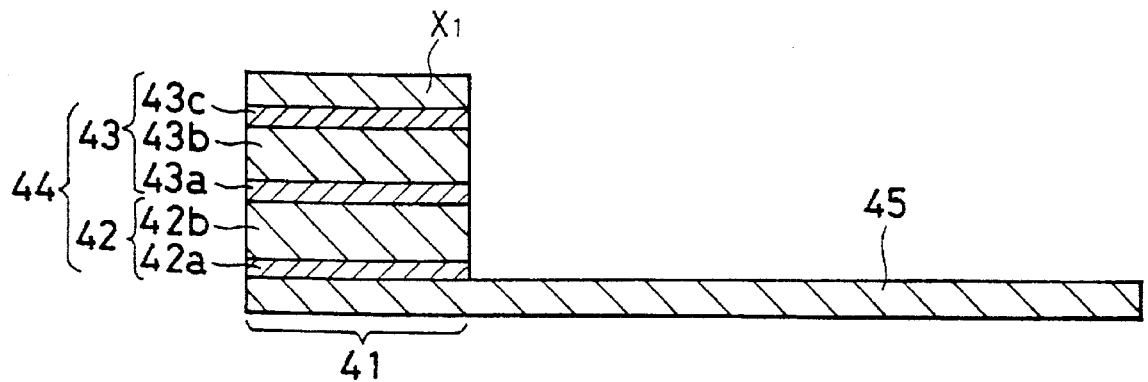
FIG. 6 is a sectional view showing a schematic arrangement of a light switching element portion arranged to use doping layers of a-SiC:H and a-Si:H.

FIG. 6 is a sectional view showing a schematic arrangement of the light switching element portion having doping layers of a-SiC:H and a-Si:H.

As shown in FIG. 6, the pixel electrode 45 and the linear electrode X1 correspond to the pixel electrode 14 and the linear electrode X1 included in the first embodiment shown FIG. 1, respectively.

The pixel electrode 45 is composed of ITO. On the portion 41 of the pixel electrode 45 where the light switching portion is formed, the photoconductive layer 41 consisting of laminating film 42 of a-SiC:H and a laminating film 43 of a-Si:H and the linear electrode X1 made of Al are produced in sequence. The laminating film 42 of a-SiC:H is provided on the light-applied side.

The materials of ITO and Al used herein are produced by means of the sputtering technique and are patterned with a photolithography technique.

The laminating film 42 of a-SiC:H for forming the photoconductive layer 44 includes an n-type a-SiC:H film 42a and an i-type a-SiC:H film 42b laminated in the describing order. The laminating film 43 of a-Si:H includes a p-type a-Si:H film 43a, an i-type a-Si:H film 43b and an n-type a-Si:H film 43c laminated in the describing order.

The photoconductive layer 44 is one embodiment of a photoconductive layer included in the present invention.

In general, since the transmissivity of light is exponentially reduced against the distance, by using the laminating film 42 made of the material of a-SiC:H with a large optical energy gap on the light-applied side, it is possible to make the light absorption of the laminating film 42 made of the material a-SiC:H strictly equal to that of the laminating film 43 made of the material a-Si:H. That is, by using such a hetero junction as making the optical energy gap of the semiconductor (photoconductive) material on the light-applied side of the laminating film 42 made of a-SiC:H larger than that of the semiconductor (photoconductive) material on the side of the other laminating film 43 made of a-Si:H, it is possible to further improve the performance of the light switching element.

By using this light switching element in place of the light switching element 15 included in the liquid crystal display device according to the first embodiment shown in FIGS. 1 and 2, it is possible to form the liquid crystal display device according to the third embodiment of the invention.

The arrangement of the liquid crystal display device according to the third embodiment is common to that of the display device according to the first embodiment except the light switching element.

In the light switching element arranged to use the pinip type laminating film made of the material a-Si:H, an npn type laminating film and a pnp type laminating film, both of which are composed of the material p-Si, it is possible to use the material of a-SiC:H or polycrystalline silicon carbide (p-SiC) with a large optical energy gap on the doping layer and the i-layer on the light-applied side. Further, the other materials such as hydrogenated amorphous silicon oxide (a-SiOx:H) and hydrogenated amorphous silicon nitride (a-SiNx:H) are allowed to be combined as considering the optical energy gaps of these materials with respect to the requested light switching performance or the wavelength of a used ray.

In the aforementioned first to the third embodiments, of the light addressing type active-matrix driving system liquid crystal display devices, a transmissive type liquid crystal display device has been described. The liquid crystal display device according to this invention is effective as a reflective type liquid crystal display device if a material having a reflective factor such as a metal film is used for the pixel electrode. By providing a color filter inside of the panel, color display is possible.

According to the foregoing embodiment, the light switching element provided in the liquid crystal display device indicates a symmetric characteristic against the polarity of the applied voltage, resulting in being able to apply a signal of a symmetric a.c. voltage waveform to the liquid crystal. Since the light switching element indicates a high impedance when no light is applied, it can meet with such an on/off ratio of the light switching element as requested for the active-matrix driving. This makes it possible to improve the switching performance, thereby enhancing the display quality.

As described above, the present invention offers a liquid crystal display device containing a liquid crystal layer provided between two substrates each of which has an electrode. One substrate provides a plurality of linear light waveguides ranged in parallel, a plurality of linear electrodes ranged in parallel and in a manner to be crossed with the plurality of linear light waveguides, and a plurality of photoconductive layers provided at crosspoints between the plurality of linear light waveguides and the plurality of linear electrodes, operated in response to the light from the linear light waveguides and each having a back-to-back diode structure. The signals applied through the linear electrode and the photoconductive layer operate to drive the pixels of the liquid crystal layer. This arrangement makes it possible to improve the switching performance, thereby enhancing the display quality.

Figure 7:
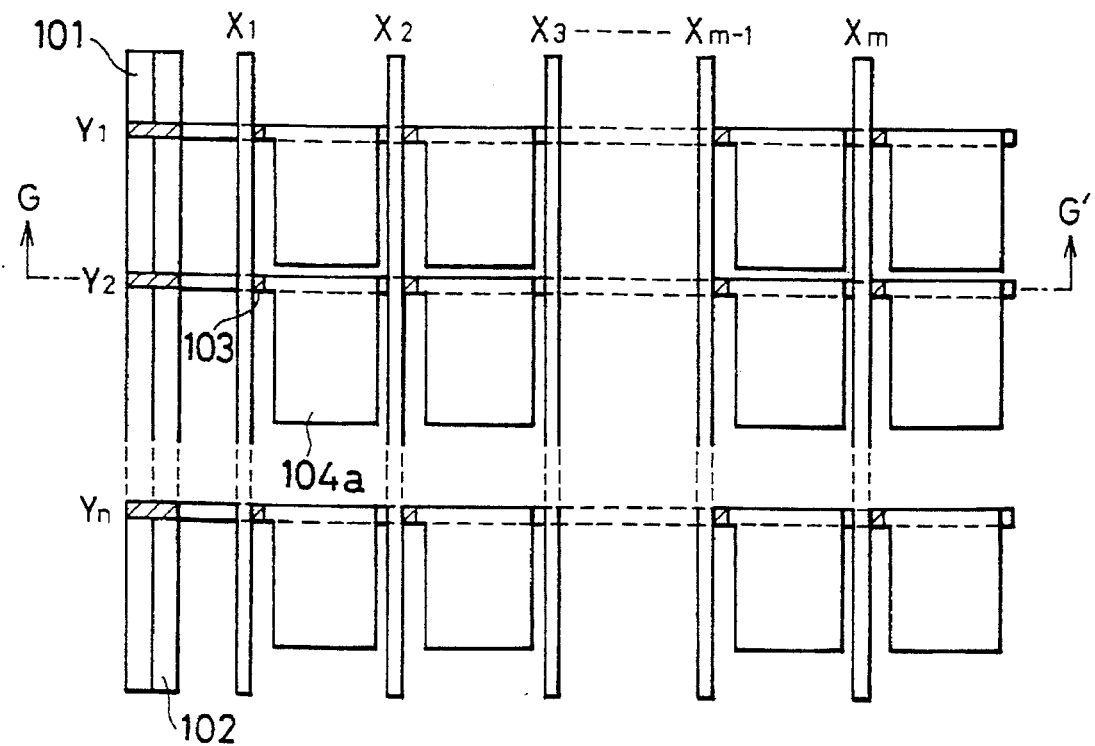
FIG. 7 is a plan view showing an arrangement of an active-matrix system light scan type liquid crystal display device according to the present invention.
Figure 8:
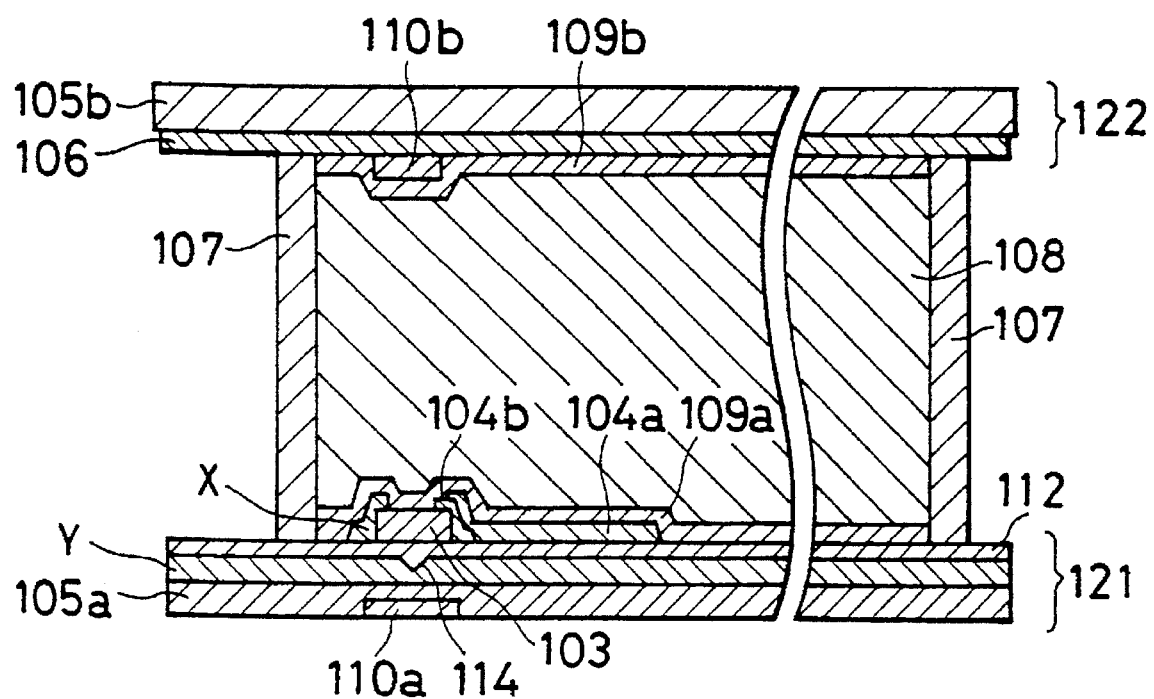
FIG. 8 is a sectional view showing on line G–G' of FIG. 7.

FIGS. 7 and 8 show an arrangement of a light scan type active-matrix system liquid crystal display device according to the present invention. This liquid crystal display device is arranged to have a pair of opposed base substrates 121 and 122 and a liquid crystal layer 108 laid between the opposed substrates 121 and 122. The base substrate 121 includes a plurality of light waveguides Y1, Y2, ..., Yn ranged on a glass substrate 105a in a horizontal manner. On these light waveguides, a plurality of signal wires X1, X2, ..., Xm ranged vertically in a manner to be crossed with the light waveguides, respectively. At each of the crosspoints between the light waveguides Y1, Y2, ..., Yn and the signal wires X1, X2, ..., Xm, a light switching element 103, 103, ... is formed. Each of the light waveguides Y1, Y2, ..., Yn is coupled with a luminous element array 101 and a micro lens array 102 at its end. The luminous element array 101 uses an LD (Laser Diode) array with high output for forming a high-definition display device with a large screen. If the high output is not necessary, the LED (Light-emitting diode) array may be used in place.

Figure 9:
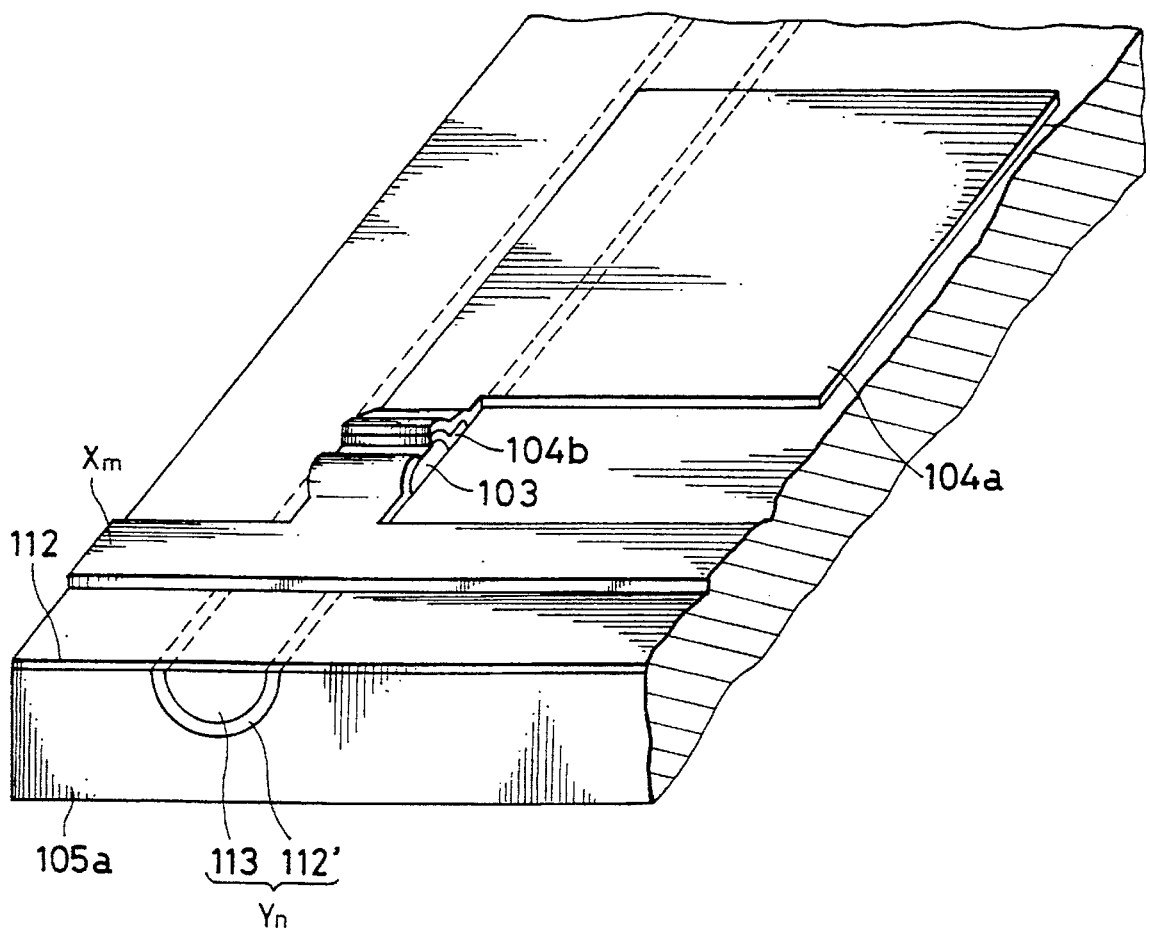
FIG. 9 is a perspective view showing part of the light scan type liquid crystal display device according to the present invention.

Next, the arrangements of the light waveguide Y, the signal wire X, and the pixel portion in one element portion will be described with reference to FIG. 9. Each of the light waveguides Y1, Y2, ..., Yn is semi-circular in section and is composed of a core layer 113 at its center and a clad layer 112' wrapping the layer 113 and is buried in the glass substrate 105a. In this embodiment, the light waveguide uses a quartz system optical fiber. In place, it may use any element if it meets the light-guiding characteristics and the condition on the manufacturing process, for example, a plastic system fiber, a glass light waveguide formed by diffusing ions like Tl+ in the glass substrate through the effect of heat or electric field, an SiO2 system light waveguide formed by means of a FHD method or a CVD method, or a light waveguide composed of a high molecular material.

On the overall surface of the glass substrate 105a, an SiO2 film is formed as a clad layer 112. On each section defined by crossing each of the light waveguides Y1, Y2, ..., Yn with each of the signal wires X1, X2, ..., Xm, the pixel electrodes 104a, 104a, ... are formed on the glass substrate 105a and are expanded on one light waveguide Y defining the section in a manner to bury this section. At each of the crosspoints between the light waveguides Y1, Y2, ..., Yn and the signal wires X1, X2, ..., Xm, the light switching element 103 formed of a photoconductive layer is provided on the light waveguide Y. On the surface of the light waveguide Y, at the place where the light switching element 103 is formed, a light scattering portion 114 made of a concave groove is provided in a manner to apply a ray of light to the light switching element 103. On the top surface of one end of the light switching element 103, the signal wire X is overlapped. On the other end, a drain electrode 104b is overlapped. A part of the pixel electrode 104a projected from the pixel electrode 104a on the drain electrode 104b covers this drain electrode 104b.

The photoconductive material for forming the light switching element 103 is a hydrogenated amorphous silicon (a-Si:H) which may be formed on a large area at low temperature by means of the CVD method. For the pixel electrode 104a, a transparent conductive film made of stannum oxide (SnO2) or Indium Tin Oxide (ITO) is used. For the signal electrode X and the drain electrode 104b, a conductive film made of titanium (Ti), aluminum (Al) or molybdenum (Mo) is used. Inside of this glass substrate 105a, a light cut-off layer 110a is provided at the spot corresponding to each light switching element 103. This light cut-off layer 110a serves to prevent outside light from the outside of the glass substrate 105a from being incident on the light switching element 103.

On the opposed substrate 122, an ITO film is formed as an opposed electrode 106 over all the pixel area inside of the glass substrate 105b by means of the sputtering technique. On the opposed electrode 106, there is formed a light cut-off layer 110b at the spot corresponding to each light switching element 103 on the base substrate 105a. This light cut-off layer 110b serves to prevent outside light from the outside of the glass substrate 105b from being incident on the light switching element 103.

On both of the glass substrates 106a and 106b, polyimide is coated with a spinner and is subject to the rubbing treatment for forming orientation films 109a and 109b. As the orientation films 109a and 109b, another film such as an organic film made of polyimide, various LB films, SiO or SiO2 obliquely deposited film or the like may be used. Both of the substrates 121 and 122 are pasted with each other with the liquid crystal layer 108 being laid therebetween.

Such a light scan type active-matrix system liquid crystal display device operates as follows. The light scan signal is fired from the luminous element array 101 to the light waveguide Y through the micro lens array 102. The signal is then propagated through the light waveguide Y and then is scattered by the light scattering portion 114 provided on the light waveguide Y. The part of scattered light is applied to the light switching element 103. In the light-applied state, the light switching element 103 lowers its impedance through the photoconductive effect so that the signal wire X may be electrically connected to the pixel electrode 104a. Hence, in this state, a signal voltage is applied to the pixel electrode 104a through the signal wire X so that the pixel electrode 104a may be selectively driven. As a result, a data signal is applied to the liquid crystal layer 108 laid between the pixel electrode 104a and the opposed electrode 106.

On the other hand, in the dark state where no light is applied, the light switching element 103 keeps a high impedance so that the signal wire X may be electrically insulated from the pixel electrode 104a. Hence, in this dark state, no data signal is applied to the liquid crystal layer 108 laid between the pixel electrode 104a and the opposed electrode 106. This results in keeping a voltage applied to the liquid crystal layer 108 in the bright state.

Next, the light switching element 103 included in the embodiment 4 will be described in detail as referring to FIG. 10. On the clad layer 112 of the light waveguide Y, there are laminated a p-type a-Si:H layer 151 (abbreviated as a p-type 151, Which holds true to an i-type and an n-type a-Si:H layer), an i-type 152 and an n-type 153 in the describing order by means of the plasma CVD technique. The film thicknesses of the p-type 151 and the n-type 153 are both about 50 nm and the film thickness of the i-type 152 is about 750 nm. Each thickness may change according to the requested element performance. The a-Si:H of the n-type 153 is patterned by an etching technique in a manner to match the form of the signal wire X and the drain electrode 104 formed on the n-type 153. On the drain electrode 104b, the pixel electrode 104a is formed. Further, to obtain a more excellent Ohmic contact, an n+ type a-Si:H may be provided on the interface between each electrode and the n-type 153 a-Si:H or may be used in place of the n-type 153 a-Si:H.

Next, the description will be oriented to the characteristic of the light switching element 103 included in the embodiment 4. In this light switching element 103, current following through each electrode (the pixel electrode 104a and the signal wire X) passes through the p-type 151 a-Si:H being more conductive than the i-type 152 a-Si:H. That is, the light switching element 103 has a structure in which two diodes 103a and 103b for making a back-to-back structure are ranged in parallel toward the application of light.

This results in allowing the same light signal to apply to the two diodes 103a and 103b, thereby obtaining a completely symmetric switching characteristic against the polarity of the applied voltage. The liquid crystal display device according to this invention having this light switching element 103, therefore, enables to solve the problem about the reliability degrade of the display medium. Further, this light switching element has a smaller number of laminations of the semiconductor than the light switching element shown in the embodiments 1, 2, 3 and does not need to adjust the element characteristic by varying a film thickness and a dopant. This makes it possible to simplify the element design and the manufacturing process.

Figure 11:
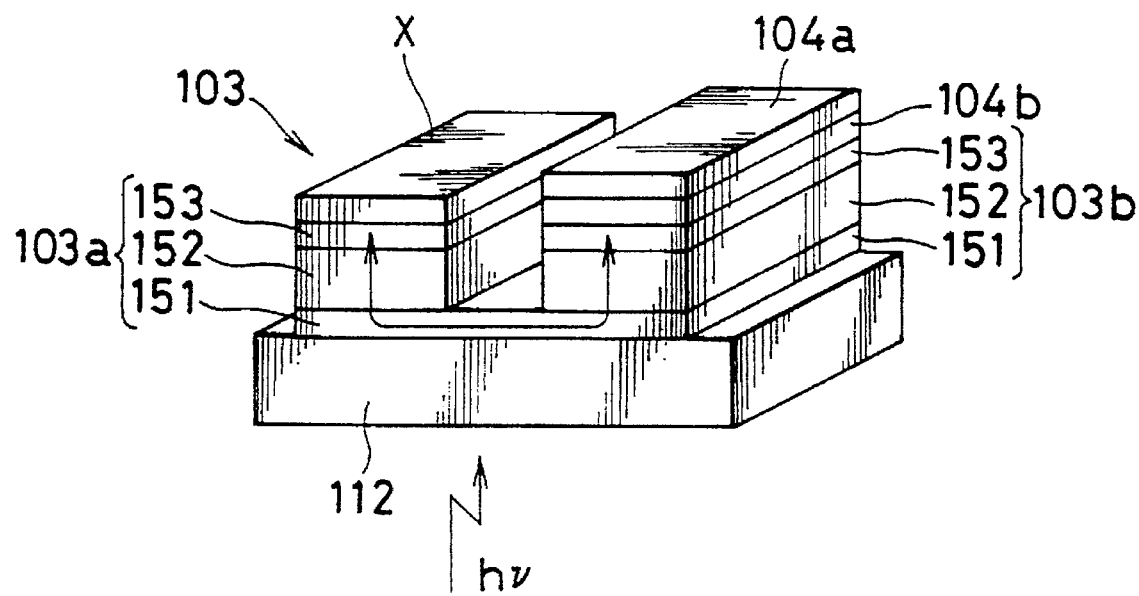
FIG. 11 is a perspective view showing a transformation of the embodiment 4 of a light switching element according to the present invention.
Figure 12:
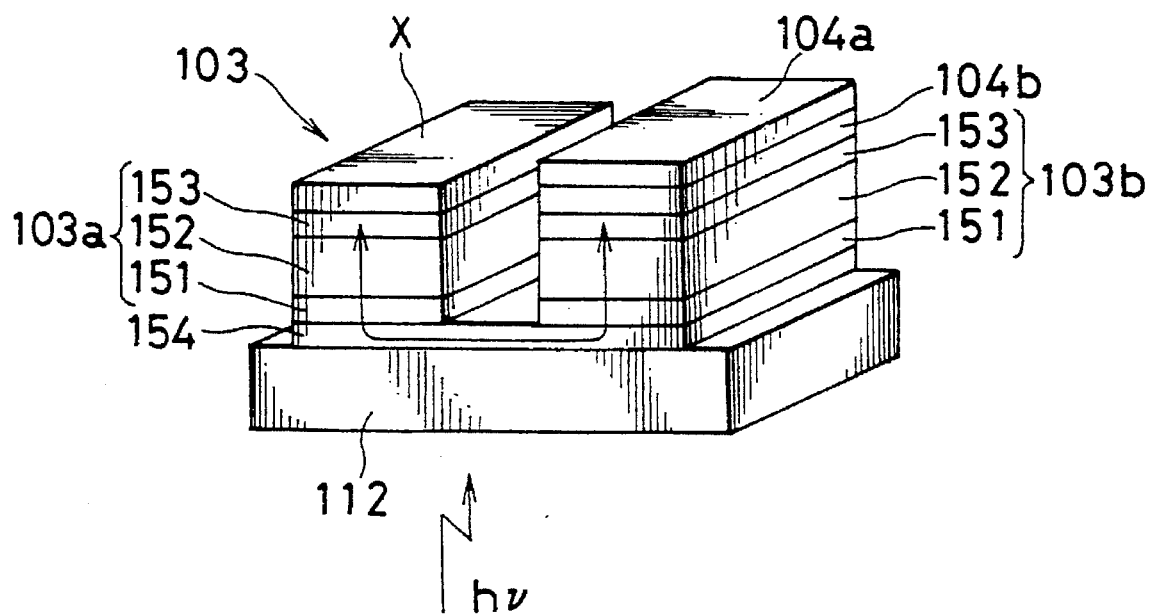
FIG. 12 is a perspective view showing another transformation of the embodiment 4 of a light switching element according to the present invention.

As another structure of the light switching element 103 for offering the same effect, as shown in FIG. 11, the i-type 152 a-Si:H may be patterned in the same manner as the n-type 153 a-Si:H. As shown in FIG. 12, the i-type 152 a-Si:H and the p-type 151 a-Si:H are patterned in the same manner as the n-type 153 a-Si:H. Then, a transparent conductive film formed of ITO or SnO2 may be provided between the base substrate and the a-Si:H.

In addition to the nipin type, a pinip type back-to-back diode structure may offer the same effect.

As a photoconductive material used for forming the light switching element 103, in addition to a-Si:H, hydrogenated amorphous silicon germanium (a-SiGex:H) may be used if the ray of light has a near infrared wavelength. In general, the development of the LD or LED having a near infrared wavelength (band of 800 nm to 1000 nm) is advanced for optical communication. Hence, it is relatively inexpensive. Further, the high output type one has been developed. That is, if such a light source is used for a light scan signal, the light switching element 103 may be arranged by using the a-SiGex:H having a high sensitivity against the ray with a near infrared wavelength. The thin film of a-SiGe:H is formed by means of the plasma CVD technique with SiH4 gas and GeH4 gas. Further, by using B2H6 or PH3 doping gas, the p-type or the n-type a-SiGex:H may be formed.

By considering the sensitivity characteristic against the wavelength of the used ray, it is possible to also use a-SiCx:H, a-SiNx:H, a-SiOx:H, a-SiSnx:H, and a-SiOxNy:H as a photoconductive material.

Next, the embodiment 5 of the present invention will be described. In this embodiment 5, in the light switching element 3 provided in the liquid crystal display device according to the embodiment 4, the semiconductor arranged to have a back-to-back diode structure uses an n-type or a p-type semiconductor material having a wider band gap than the i-type material. By this, the light switching element with higher performance can be manufactured.

For instance, in the case of using the a-Si:H film as indicated in the embodiment 4 as the i-type semiconductor layer, as the n-type or the p-type semiconductor layer, it is better to use the a-SiCx:H film having a wider band gap than the a-Si:H film. The embodiment 5 of this invention employs the light switching element 103 which uses such an a-SiCx:H film as one of the materials.

Figure 13:
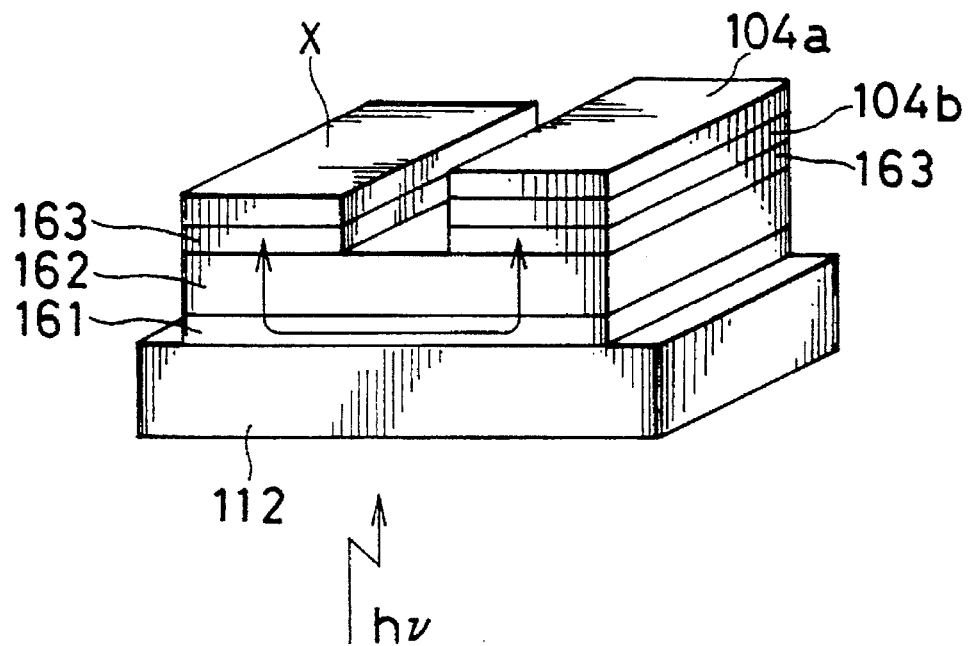
FIG. 13 is a perspective view showing an embodiment 5 of a light switching element according to the present invention.

FIG. 13 shows the light switching element 103 included in the liquid crystal display device according to the embodiment 5 of the present invention in detail. The arrangement of the liquid crystal display device except the light switching element 103 is the same as that of the embodiment 4. On the clad layer 112 of the light waveguide Y, the p-type 162 a-SiCx:H, the i-type 162 a-Si:H and the n-type 163 a-SiCx:H are laminated in the describing sequence. On the lamination, the signal electrode X is formed. That is, a material with a wide band gap is used in the doping layer on the side of the base substrate 121, namely, the light-applied side. The band gaps of the a-Si:H and the a-SiCx:H used in this embodiment are 1.72 eV and 1.9 eV as resulting of measuring an absorption spectrum on a single phase film. If the light scan signal uses a ray of light with a wide wavelength band, the p-type 161 a-SiCx:H of the material with a wide band gap does not absorb the ray of light on a short wavelength so much. Hence, the i-type 162 a-Si:H more strongly applied by an electric field mainly absorbs the ray of light. It means that the light switching element 103 can effectively use light.

The film made of a-SiCx:H is formed by the CVD technique with SiH4 gas and CH4 gas. By using B2H6 and PH3 doping gas, the p-type or the n-type a-SiCx:H may be formed.

As a material with a wide band gap used in the embodiment 5, it is possible to use a-SiNx:H (Eg=1.7 to 5.5 eV), a-SiOx:H and a-SiOxHy:H in addition to a-SiCx:H (Eg=1.7 to 2.8 eV).

In addition, it is possible to combine another material such as a-Si:H (Eg=1.6 to 2.0 eV), a-SiGex:H (Eg=1.3 to 1.7 eV) and a-SiSnx:H (Eg=1.0 to 1.8 eV).

Hereafter, the embodiment 6 of the present invention will be described. The liquid crystal display device indicated in the embodiments 4 and 5 is arranged to have a pin structure or a hetero junction type pin structure of the semiconductor for forming the switching element in order to provide the light switching element with the diode characteristic, while the embodiment 6 has a diode formed by a simpler process without using the doping layer of the semiconductor. That is, the embodiment 6 uses a Schottky diode structure. The embodiment 6 of the present invention employs the light switching element 103 formed by using this Schottky diode structure.

Figure 14:
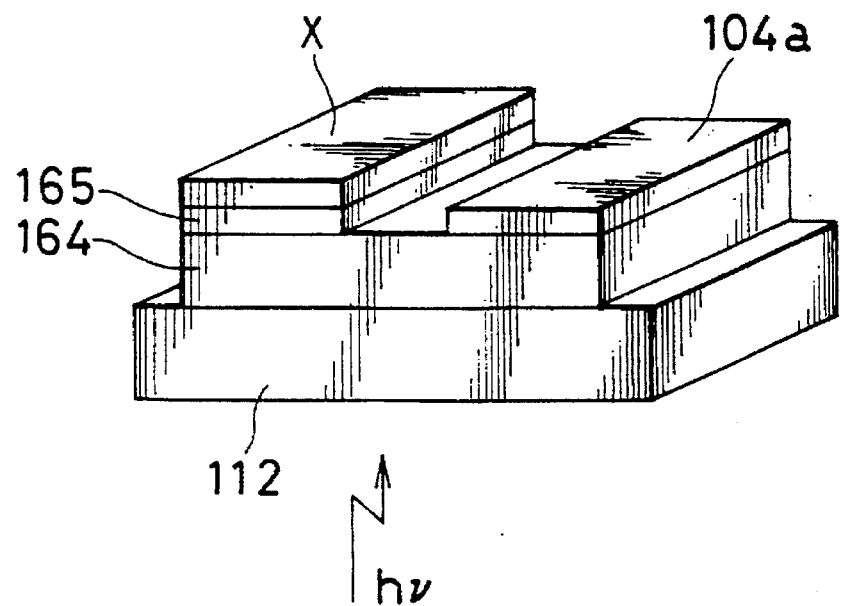
FIG. 14 is a perspective view showing an embodiment 6 of a light switching element according to the present invention.

FIG. 14 shows the light switching element 103 provided in the liquid crystal display device according to the embodiment 6 of the present invention. The arrangement of the liquid crystal display device except the light switching element 103 is same as that of the embodiment 4. On the clad layer 112 of the light waveguide Y, an a-Si:H film 164 of a photoconductive material is formed by means of the plasma CVD technique. The thickness of the film 164 is about 1 μm. The thickness may be varied according to the requested element performance. An ITO film 165 having a thickness of about 100 nm is formed between the a-Si:H film 164 and the signal wire X by means of the sputtering technique. The pixel electrode 104a made of an ITO film is directly formed on the a-Si:H film 164. That is, the signal wire X and the pixel electrode 104a are connected to the a-Si:H film at the interface of ITO/a-Si:H, respectively.

Since the interface of the ITO/a-Si:H takes a Schottky junction, the light switching element 103 has a back-to-back structure in which two Schottky diodes are series-connected in reverse. That is, two diodes for composing the back-to-back structure are located in parallel toward the application of light. This results in allowing the same light signal to be applied to these two diodes, thereby obtaining a completely symmetric switching characteristic against the polarity of the applied voltage. The embodiment 6 can offer the same effect as the embodiment 4 and be manufactured at a simpler process since no doping layer of the semiconductor is required.

Further, as a Schottky electrode material against the a-Si:H, it is possible to use a transparent electrode material such as SnO2 in addition to ITO. The signal wire X may be made of Pd, Cr, Ti, Ni, Mo and the like in addition to Al. The influence of the Schottky barrier on the interface with the photoconductive material is variable according to the used electrode material. The diode characteristic changes according to the influence of the Schottky barrier. Hence, the electrode material may be selected according to the request. Since the Schottky electrode material and the pixel electrode 104a may be used in common, it is preferable to use the same material.

Hereafter, the embodiment 7 of the present invention will be described. The present invention is effective if the light waveguides Y1, Y2, . . . , Yn are provided on the side of the opposed substrate 122, that is, the light switching elements 103, 103, . . . and the light waveguides Y1, Y2, . . . are mounted on respective substrates in the light scan type active-matrix driving system liquid crystal display device the applicants of the present application proposed in the Japanese Patent Application No. Hei 3-258110. Hence, this embodiment 7 employs the display device arranged like this.

Figure 15:
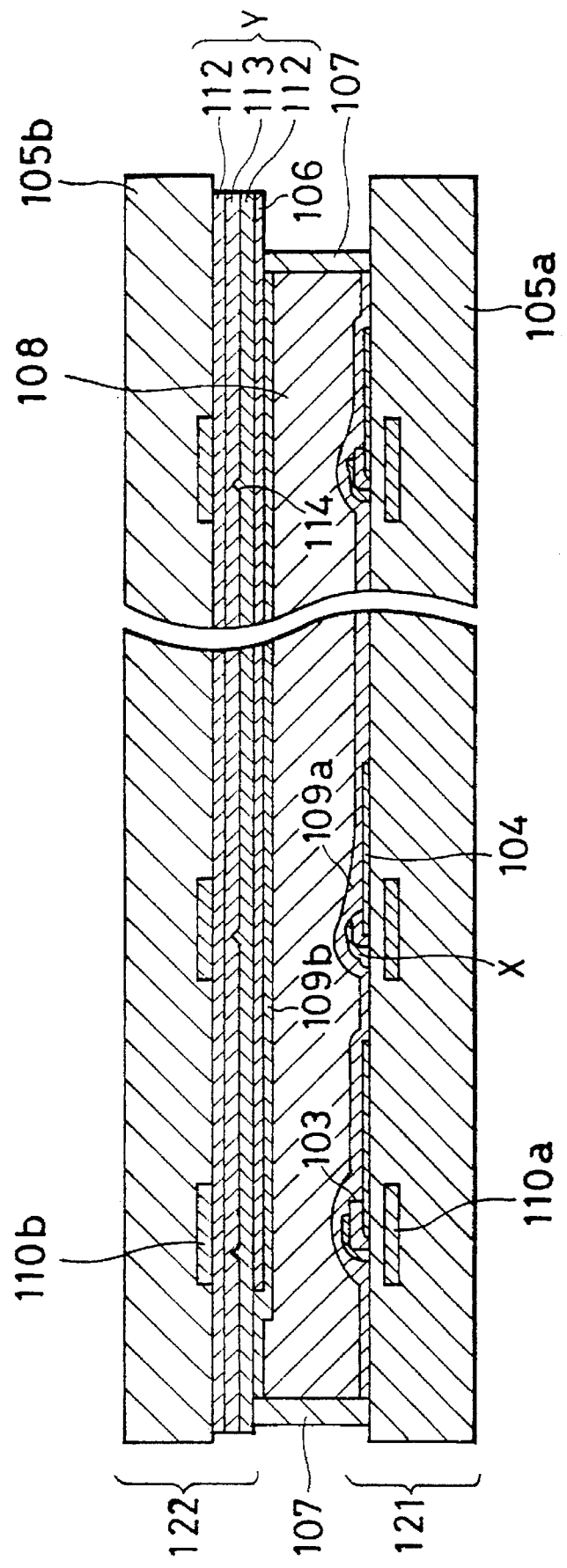
FIG. 15 is a sectional view showing a light scan type liquid crystal display device according to an embodiment 7 of the present invention.

FIG. 15 shows an arrangement of the liquid crystal display device according to the embodiment 7. The basic element arrangement is same as that of the liquid crystal display according to the embodiment 4. This embodiment 7 is characterized by providing the light waveguides Y1, Y2, . . . , Yn on the opposed substrate 122 located in opposition to the base substrate 121 on which the light switching elements 103, 103, . . . are formed. In this figure, the luminous element array an the micro lens array are not illustrative. The light switching elements 103, 103, . . . each may have a diode structure like the liquid crystal display device indicated in the embodiment 4 to 6, for the purpose of offering the same effect as the embodiment 4.

The present invention may apply to the active-matrix driving system liquid crystal display device as well as a light scan type duty driving system liquid crystal display device as proposed in the Japanese Patent Application No. Hei 3-258110 by the applicants of the present application. This embodiment 8 is concerned with the liquid crystal display device.

Figure 16:
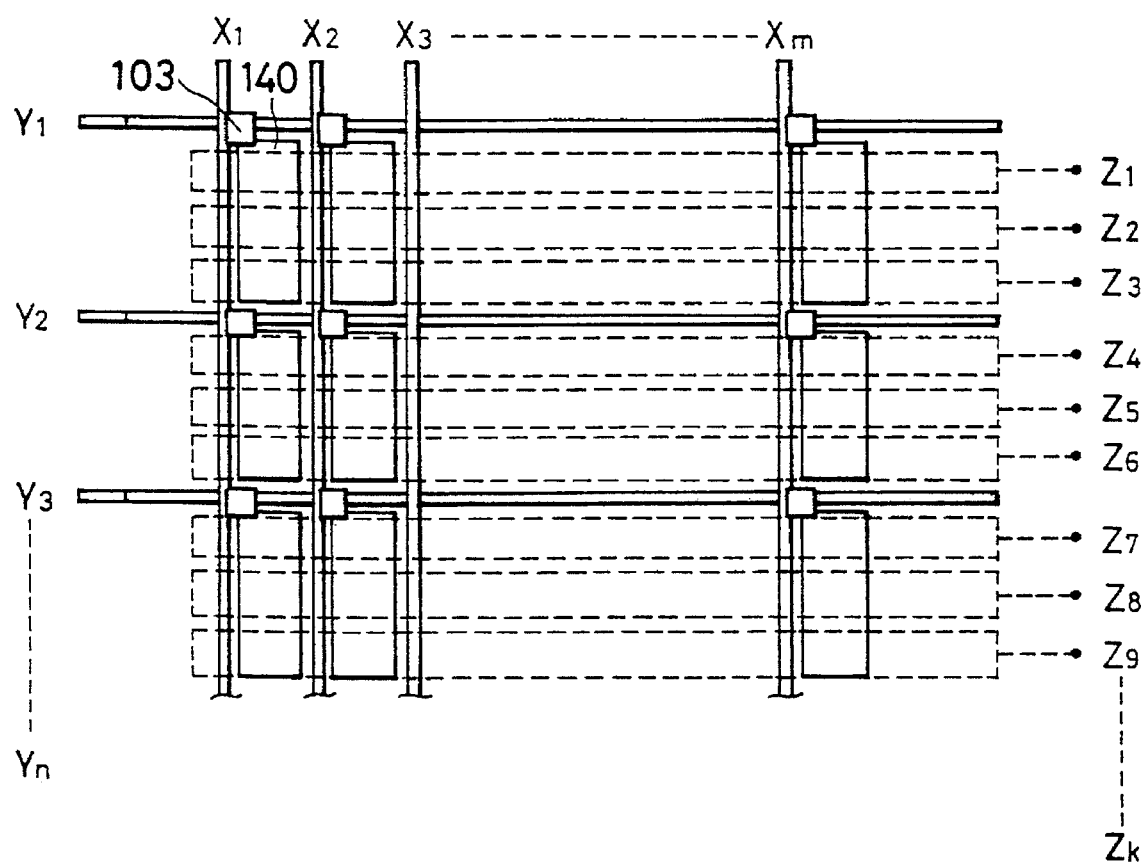
FIG. 16 is a plan view showing an arrangement of a simple matrix system light scan type liquid crystal display device according to an embodiment 8 of the present invention.
Figure 17:
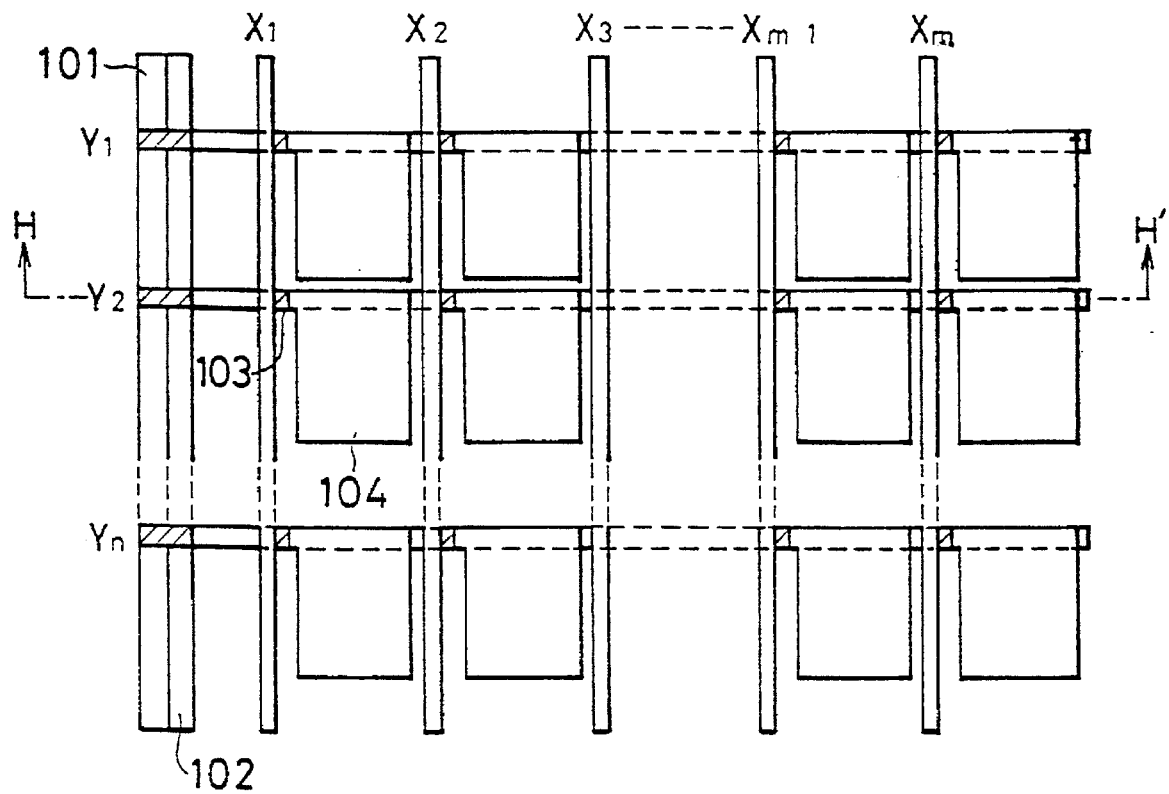
FIG. 17 is a plan view showing an arrangement of the conventional active-matrix system light scan type liquid crystal display device.
Figure 18:
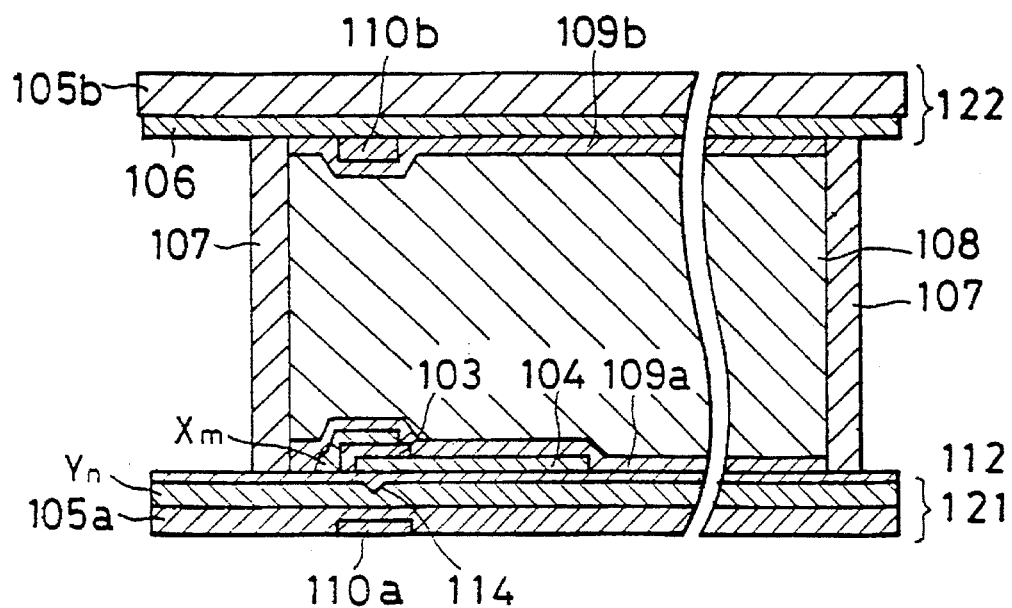
FIG. 18 is a sectional view on line H–H' of FIG. 17.
Figure 19:
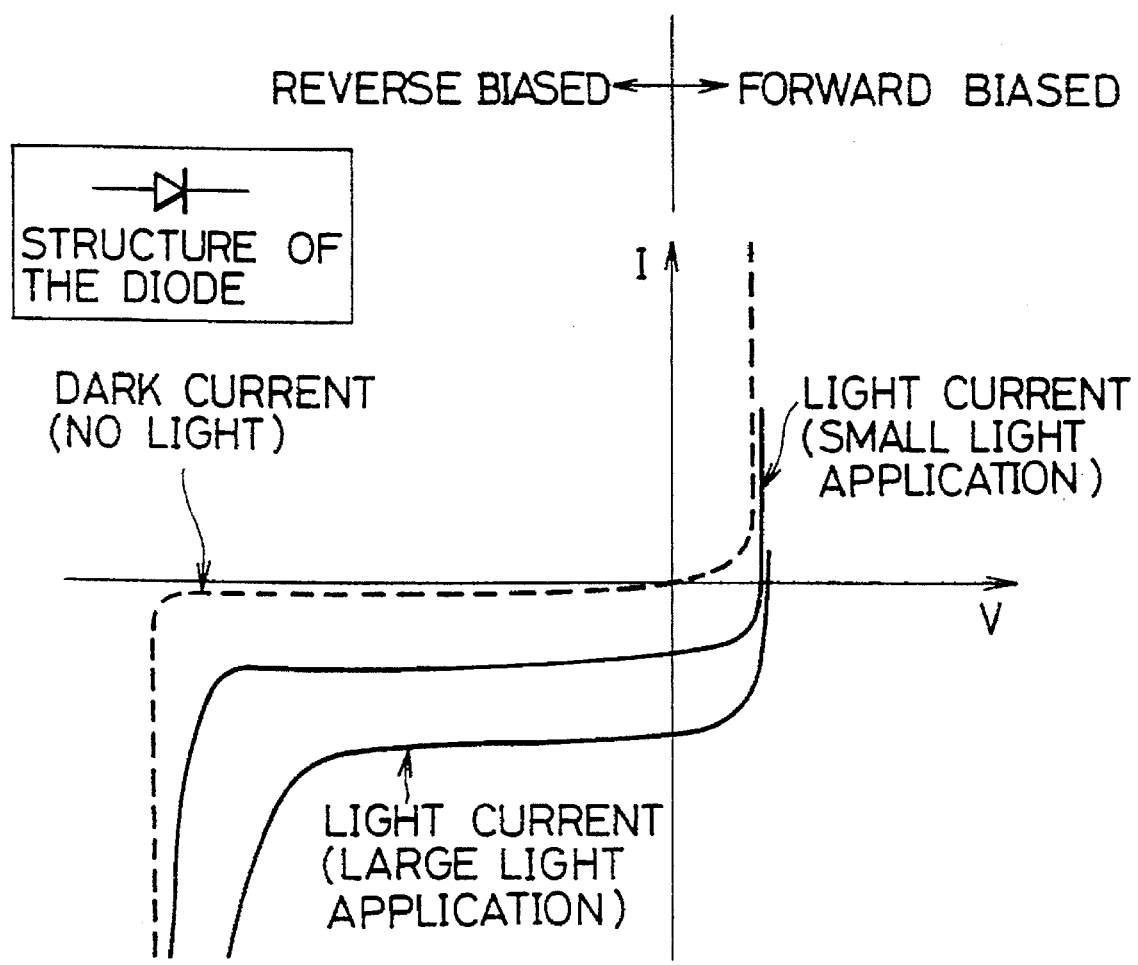
FIG. 19 is a graph showing a voltage to current characteristic of a general diode.

FIG. 16 shows a liquid crystal display device according to the embodiment 8 of the present invention. In this embodiment 8, the light waveguides Y1, Y2, . . . , Yn are ranged horizontally on one base substrate. On these light waveguides, the signal wires X1, X2, . . . , Xm are ranged vertically in a manner to be crossed with the light waveguides, respectively. As shown in FIG. 16, at each of the sections defined by the light waveguides Y1, Y2, . . . , Yn and the signal wires X1, X2, . . . , Xm, the pixel electrodes 140, 140, . . . are provided in a manner to substantially bury the sections. Each of the signal wires X1, X2, . . . , Xm is coupled with the pixel electrode 140 of the corresponding column through the light switching element 103. In this figure, the luminous element array and the micro lens array are not illustrative.

On the opposed substrate to the base substrate arranged as above, there are formed a plurality of transparent linear electrodes Z1, Z2, . . . , Zk. Each three of the linear electrodes Z1, Z2, . . . , is ranged in parallel to the corresponding one of the light waveguides Y1, Y2, . . . , Yn on each region on the opposed substrate corresponding to the region laid between the adjacent light waveguides Y1, Y2, . . . , Yn. Hence, each of the pixel electrodes correspond to three linear electrodes.

Such a liquid crystal display device operates as follows. A light scan signal is transmitted to the light waveguides Y1, Y2, . . . , Yn in sequence so that the signal wires X1, X2, . . . , Xm may be electrically connected to the pixel electrodes 140, 140, . . . , respectively. At a time, by sequentially operating the linear electrodes Z1, Z2, . . . , Zk, a simple multiplexing type driving is performed between the pixel electrode 140 and each three linear electrodes, for instance, Z1, Z2 and Z3 opposing to the pixel electrode 140. That is, in this embodiment 8, a display region for the three linear electrodes Z1, Z2 and Z3 is assumed as one unit block. The blocks are selected by the light waveguides Y1, Y2, ..., Yn. This results in making it possible to triple the scan lines in number as keeping a duty ratio constant.

In general, assuming that the number of the light waveguides is N and the number of scan lines per one light waveguide is M, it is possible to drive N×M scan lines at a duty ratio of 1/M. Also in this embodiment 8, the light switching element 103 operates in the same manner as the light switching element 103 used in the active-matrix driving system liquid crystal display device according to the embodiments 4 to 7. That is, the signal wires X1, X2, ..., Xm and the pixel electrodes 140, 140 ... are electrically switched on and off according to the bright or the dark state.

The liquid crystal layer included in the liquid crystal display device according to the present invention uses a TN (Twisted Nematic) mode. The liquid crystal material is a fluorine system liquid crystal ZLI4792 manufactured by the MERCK company. As a liquid crystal display mode, a guest host mode, a ECB (Electrically Controlled Birefringence) mode, an STN (Super Twisted Nematic) mode, or a phase transition mode may be used. Further, an SSFLC (Surface Stabilized Ferroelectric Liquid Crystal) mode using chiral smectic liquid crystal, a PDLC (Polymer Dispersed Liquid crystal) using a compound of a high molecular material and liquid crystal may be used as well.

Each embodiment of the present invention is structured to have a transmission type liquid crystal display device belonging to the light addressing type liquid crystal display device. By using a reflective type material such as a metal film for the pixel electrode, this invention may be effective as a reflective type liquid crystal display device. By providing a color filter inside of a panel, color display is made possible.

Further, each embodiment of the present invention has been described about the liquid crystal display device using a display medium as liquid crystal. The present invention may offer the same effect in another type of display device such as an electrochromic display or an electrophoretic display.

In the display device in which light switching element being composed of two diodes for comprising a back-to-back structure located in parallel toward the application of light, the light switching element has an element structure in which pairs of diodes connected to have a back-to-back structure are ranged in parallel toward the application of light so that it may indicate a complete symmetric switching characteristic against the polarity of an applied voltage. This results in being able to suppress the degrade of liquid crystal served as a display medium, thereby realizing a highly reliable display device with an excellent display performance.

In the display device in which the light switching element is formed by partially etching a pin junction type or an nip junction type laminating film of a semiconductor, the light switching element uses a pin-structured semiconductor. Hence, the resulting switching element may offer a large impedance change, that is, a large on/off ratio. The display device offers excellent response and high reliability.

In the display device in which the light switching element is formed by partially etching a hetero junction type pin or nip laminating film of a semiconductor, the light switching element uses a hetero junction type pin-structured semiconductor. The resulting switching element may offer a larger impedance change.

In the display device in which the hetero junction type pin or nip laminating film of the semiconductor is formed of a semiconductor material having a larger optical band gap of at least one of an n layer and a p layer than that of an i layer, the light switching element uses a material with a large optical wide band gap for at least one of an n layer and a p layer of the semiconductor layer. The resulting switching element may offer excellent light absorption and high response.

In the display device in which the two diodes are Schottky barrier diodes, the Schottky structure is used for forming a back-to-back diode. This results in eliminating the necessity of a doping layer formed in the semiconductor. Hence, the manufacturing process of the light switching element is made simpler, thereby improving the manufacturing efficiency.

In the display device in which the driving system is an active-matrix driving system, the display device is driven in an active-matrix manner. The display device offers quick response and high resolution.

In the display device in which on the other substrate opposed to said one substrate, opposed electrodes are formed in a striped manner and a display block for a plurality of said opposed electrodes are driven as a batch in a simple multiplexing manner, the display region for three linear electrodes Z1, Z2 and Z3 is assumed as one unit block. Each of the blocks is selected by the light waveguides Y1, Y2, ..., Yn. This makes it possible to triple the scan lines as keeping a constant duty ratio.

In the display device in which the display medium is liquid crystal, the liquid crystal display device may offer the above-mentioned excellent effects.

Many widely different embodiments of the present invention may be constructed without departing from the spirit and the scope of the present invention. It should be understood that the present invention is not limited to the specific embodiments described in the specification, except as defined in the appended claims.

What is claimed is:

1. A display device having a plurality of display elements arranged in a matrix manner, comprising:

two substrates;

a display medium sealed between said two substrates;

a plurality of light waveguides arranged in parallel to each other in one direction on one of said two substrates;

a plurality of signal wires arranged in parallel to each other in a direction crossed with said plurality of light waveguides; and a plurality of light switching elements, operating in response to a signal ray of light transmitted from said light waveguides, being provided at crossings of said plurality of light waveguides and said plurality of signal wires, for driving display pixels of said display medium in response to a signal applied thereto through said signal wires and said light switching elements, each of said light switching elements including two diodes electrically connected back-to-back and disposed side by side on one of said light waveguides, at positions equally distant from incident light transmitted by said one of said light waveguides, in such a manner that said two diodes are equally influenced by said signal ray of light transmitted from said one of said light waveguides.

2. A display device as claimed in claim 1, wherein said two diodes are Schottky barrier diodes.

3. A display device as claimed in claim 1, wherein the driving system is an active-matrix driving system.

4. A display device as claimed in claim 1, wherein on the other substrate opposed to said one substrate, opposed electrodes are formed in a striped manner and a display block for a plurality of said opposed electrodes are driven as a batch in a simple multiplexing manner.

5. A display device as claimed in claim 1, wherein said display medium is liquid crystal.

6. A display device as claimed in claim 1, wherein said one substrate has a plurality of pixel electrodes, each pixel electrode being corresponding to one of said display element, each of said switching elements being located between one of said pixel electrodes and signal electrode close to said pixel electrode.

* * * * *